United States Patent

Sawada

Patent Number: 5,465,326
Date of Patent: Nov. 7, 1995

[54] MIXED-MODE TRANSMISSION CONTROL APPARATUS FOR ADDING AN IDENTIFICATION BLOCK TO MIXED-MODE DATA

[75] Inventor: Nozomi Sawada, Ebina, Japan

[73] Assignee: Ricoh Company, Ltd., Tokyo, Japan

[21] Appl. No.: 264,231

[22] Filed: Jun. 22, 1994

Related U.S. Application Data

[63] Continuation of Ser. No. 794,028, Nov. 19, 1991, abandoned.

[30] Foreign Application Priority Data

Nov. 20, 1990 [JP] Japan .................................. 2-312828

[51] Int. Cl.⁶ .................................................. G06T 11/60
[52] U.S. Cl. .......................... 395/147; 358/438; 358/448; 358/450; 358/462; 358/470
[58] Field of Search .................................. 395/147, 200; 364/419.02, 419.16; 358/434–439, 462, 448, 467–468, 470, 450; 382/9

[56] References Cited

U.S. PATENT DOCUMENTS

| | | | |
|---|---|---|---|
| 4,255,766 | 3/1981 | Matsuda et al. | 358/257 |
| 4,317,136 | 2/1982 | Keyt et al. | 358/256 |
| 4,432,020 | 2/1984 | Onose et al. | 358/257 |
| 4,581,656 | 4/1986 | Wada | 358/257 |
| 4,792,648 | 12/1988 | Oasawara | 178/4 |
| 4,811,111 | 3/1989 | Kurokawa | 358/257 |
| 4,829,385 | 5/1989 | Takezawa | 358/260 |
| 4,870,402 | 9/1989 | DeLuca et al. | 340/825.440 |
| 4,949,188 | 8/1990 | Sato | 358/448 |
| 4,961,185 | 10/1990 | Sawada | 370/79 |
| 5,084,770 | 1/1992 | Nakayama | 358/403 |
| 5,086,497 | 2/1992 | Horikawa | 395/147 |
| 5,113,492 | 5/1992 | Ariki et al. | 395/147 |
| 5,274,474 | 12/1993 | Medina | 358/462 |
| 5,276,687 | 1/1994 | Miyamoto | 370/110.1 |

*Primary Examiner*—Mark K. Zimmerman
*Assistant Examiner*—J. Feild
*Attorney, Agent, or Firm*—Oblon, Spivak, McClelland, Maier & Neustadt

[57] ABSTRACT

A mixed-mode transmission control apparatus for transmitting a mixed-mode document data from a transmitting terminal to a reception terminal via a network. The apparatus includes a storage part in which at least a transmitting terminal identifying data and a page number denoting each page of the mixed-mode document data are stored, a generating part for generating an identification block into which at least the terminal identifying data and the page number are transferred from the storage part, an editing part for editing the mixed-mode document data before transmission so as to add the identification block thereto, and a control part for transmitting the mixed-mode document data, to which the identification block is added, to the reception terminal by performing a predetermined data transmission procedure.

13 Claims, 9 Drawing Sheets

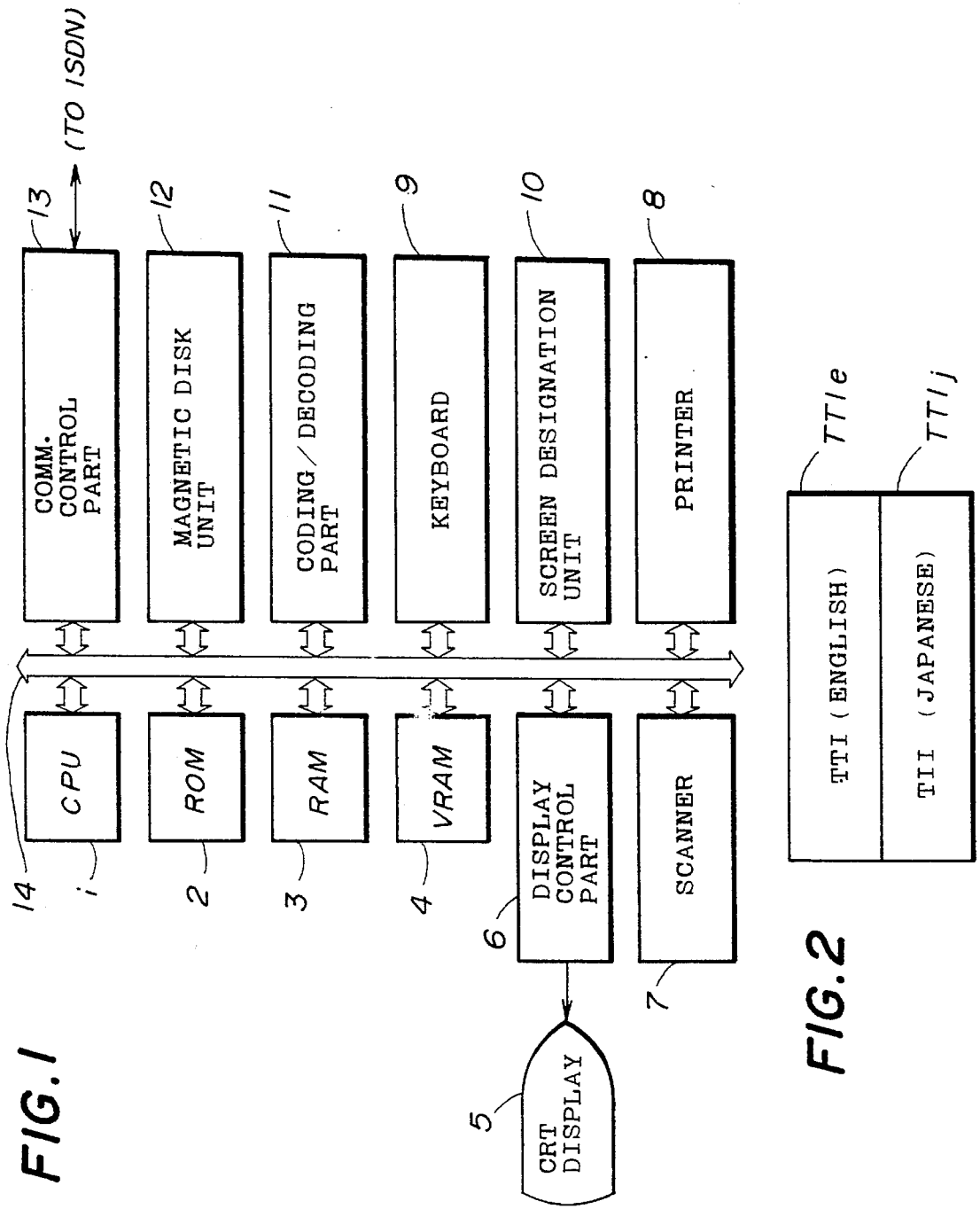

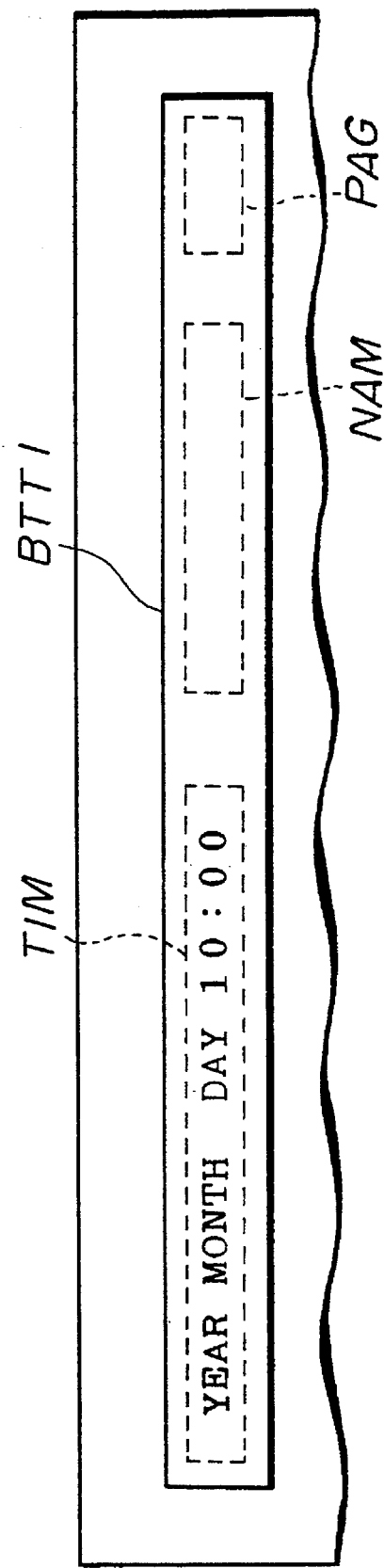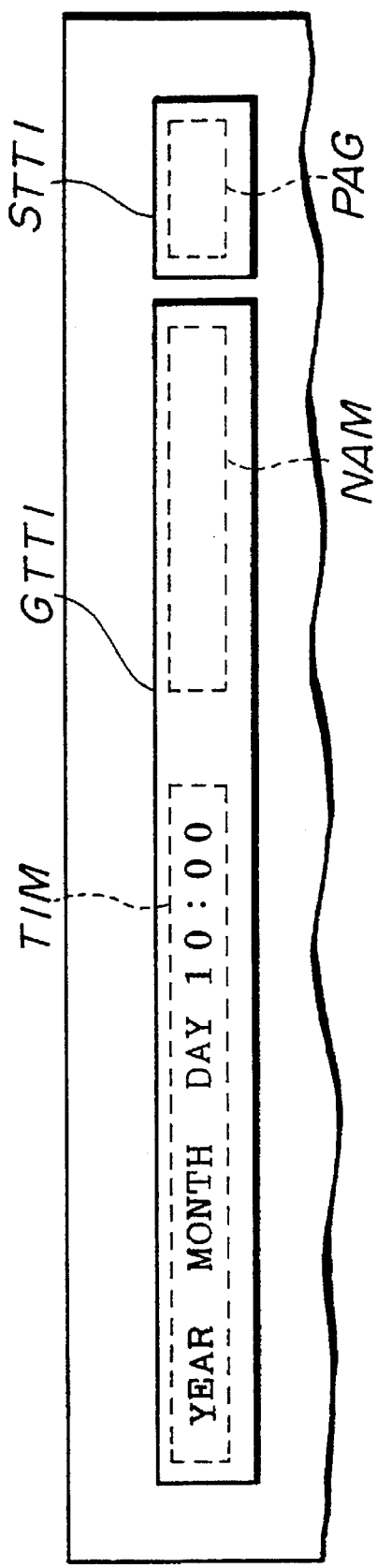

2

MIXED-MODE TRANSMISSION CONTROL APPARATUS FOR ADDING AN IDENTIFICATION BLOCK TO MIXED-MODE DATA

This application is a continuation of application Ser. No. 07/794,028, filed on Nov. 19, 1991, now abandoned.

BACKGROUND OF THE INVENTION

The present invention generally relates to a mixed-mode transmission control apparatus, and more particularly to a mixed-mode transmission control apparatus which transmits document data including a transmitting terminal identification data to a reception terminal via an integrated services digital network.

Generally speaking, a conventional mixed-mode transmission control apparatus can carry out transmission and reception of a mixed-mode document containing text and image information. In such a conventional apparatus which receives a mixed-mode document from a transmitting terminal, it is possible to make use of the received document for preparing and editing a different document at the reception terminal. For example, the conventional mixed-mode transmission control apparatus can copy part of text data of the received document into another document to be edited, and it can utilize the image data of the received document when a new document is created.

However, the conventional mixed-mode transmission control apparatus is unable to add a transmitting terminal identifying data to a sending mixed-mode document data at the transmitting terminal when the document data is transmitted to a reception terminal, and there is a problem in that it is difficult for an operator at the reception terminal to judge which transmitting terminal sent the document data having been received and printed out by the reception terminal.

Among telematics service devices including the mixed-mode transmission control apparatus, a group-4 class-1 facsimile is capable of transmitting only image data and is unable of transmitting a mixed-mode document. In a case of this telematics service device, a reception terminal, which is a group-4 class-1 facsimile, can add a call identifying data to a received image data and record the received image data with the call identifying data. This call identifying data contains information describing a transmitting terminal, the reception terminal and a page number of the received document. Thus, application of the above capability of the group-4 class-1 facsimile to the mixed-mode transmission control apparatus is easily conceivable. However, the mixed-mode transmission control apparatus has a primary requirement that a document data created by a user at a transmitting terminal is transmitted to a reception terminal with no additional data, and the received document data received by the reception terminal with no data added be reconstructed by a user at the reception terminal. Therefore, the above capability of the group-4 class-1 facsimile, which is the addition of the call identifying data by the reception terminal to the received document, is not suitable for the mixed-mode transmission control.

SUMMARY OF THE INVENTION

Accordingly, it is a general object of the present invention to provide an improved mixed-mode transmission control apparatus in which the above described problems of the conventional apparatus are eliminated.

Another and more specific object of the present invention is to provide a mixed-mode transmission control apparatus which can add a transmitting terminal identifying data to a mixed-mode document data appropriately and transmit the mixed-mode document data with the added identifying data to a reception terminal. The above mentioned objects of the present invention can be achieved by a mixed-mode transmission control apparatus for transmitting a mixed-mode document data from a transmitting terminal to a reception terminal via a network, which includes a storage part in which a terminal identifying data identifying the transmitting terminal, a date/time data denoting a date and time of transmission and a page number denoting each page of the mixed-mode document data are stored, a generating part for generating an identification block into which at least the terminal identifying data, the date/time data and the page number are transferred from the storage part, an editing part for editing the mixed-mode document data so as to add the identification block generated by the generating part to the document data before the transmission, and a control part for transmitting the mixed-mode document data, to which the identification block is added by the editing part, to the reception terminal by performing a predetermined data transmission procedure. According to the present invention, the transmitting terminal identifying data is added to a sending document data by the transmitting terminal and the reception terminal receives the document data with such identifying data from the transmitting terminal, and it is possible for the reception terminal to easily judge which transmitting terminal sent the document data. The transmitting terminal identifying data includes a page data which is inserted into each page of the received document data, and it is possible for a user at the reception terminal to clearly discriminate the sequence of pages of the received document data. According to the present invention, raster data can be used as part of the transmitting terminal identifying data, and it is possible to include arbitrary graphic data in the transmitting terminal identifying data.

Other objects and further features of the present invention will be apparent from the following detailed description when read in conjunction with the accompanying drawings.

BRIEF DESCRIPTION OF THE DRAWINGS

FIG. 1 is a block diagram showing the construction of a mixed-mode transmission control apparatus according to the present invention;

FIG. 2 is a diagram showing a transmitting terminal identifying data stored in a magnetic disk unit;

FIGS. 4A and 4B are diagrams showing examples of identification blocks being added to a document data;

DESCRIPTION OF THE PREFERRED EMBODIMENT

Figure 3B:
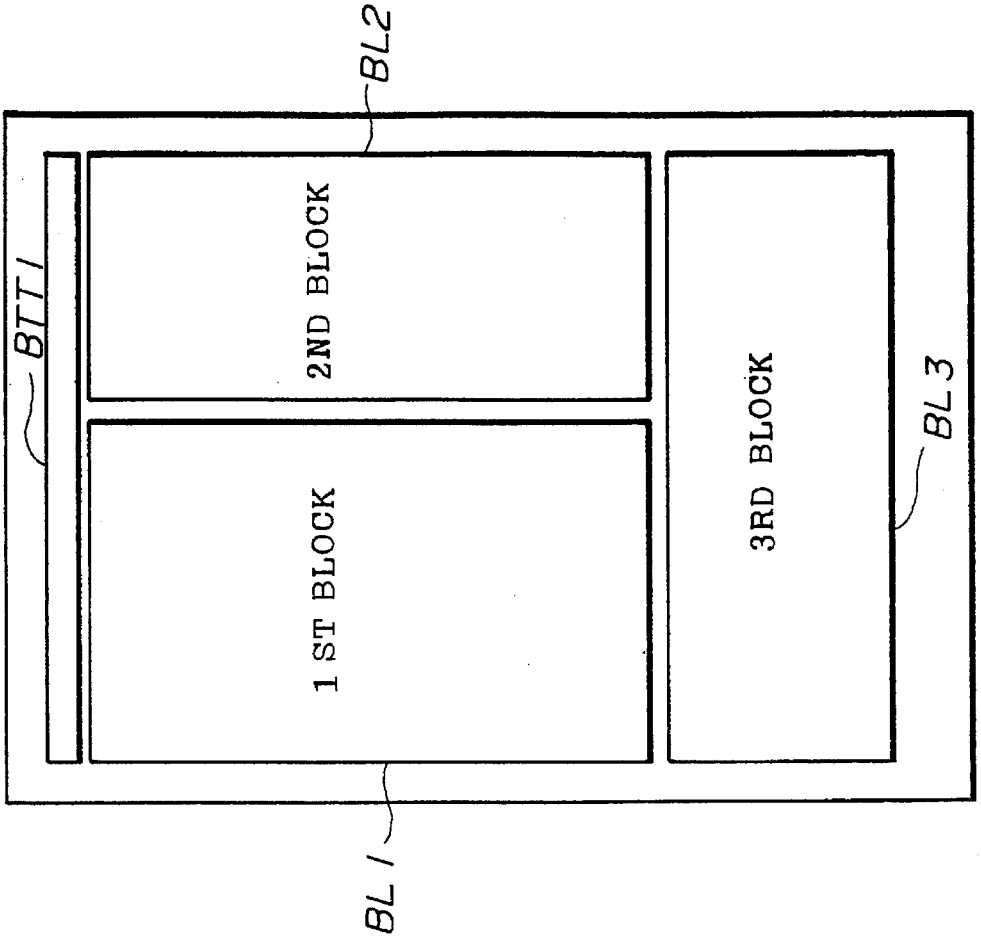
FIG. 3A is a diagram showing a mixed-mode document data being transmitted and FIG. 3B is a diagram showing the mixed-mode document to which an identification block is added.

A description will now be given of the construction of a mixed-mode transmission control apparatus to which the present invention is applied, and this mixed-mode transmission control apparatus is capable of adding transmitting terminal identifying data to a mixed-mode document data exchanged between transmitting and reception terminals. The mixed-mode document data including both text data and image data is transmitted from a transmitting terminal to a reception terminal via an integrated services digital network (ISDN). In FIG. 1, a central processing unit (CPU) 1 executes control processes for operating the mixed-mode transmission control apparatus, a read-only memory (ROM) 2 is a fixed data memory in which unchanged character font data and part of control programs to be executed by the CPU 1 are stored, and a random-access memory (RAM) 3 is used by the CPU 1 as a work area needed when a control process for the mixed-mode transmission control apparatus is carried out by the CPU 1.

Also, in the mixed-mode transmission control apparatus shown in FIG. 1, a video RAM (VRAM) 4 is a memory part in which display data to be outputted to a CRT display unit 5 is stored, and this VRAM 4 has a storage capacity to store video information corresponding to two or more screen pages of display data outputted to the CRT display unit 5. A display control part 6 converts the display data stored in the VRAM 4 into output data which can be outputted to the CRT display unit 5, so that the converted output data is displayed on the screen of the CRT display unit 5. A scanner 7 is an image reading part for reading out image data at a predetermined resolution by scanning a document, and a printer 8 is an output part for outputting and recording a received image data at a predetermined resolution.

Also, a keyboard unit 9 is an input unit of the mixed-mode transmission control apparatus from which an operator inputs a character data, makes a choice out of the functions which the mixed-mode transmission control apparatus provides, and makes a command for directing the mixed-mode transmission control apparatus to perform a desired operation. A screen designation unit 10 designates an arbitrary point within a screen of the CRT display unit 5 and gives a selection data for a selection screen displayed on the CRT display unit 5. A coding/decoding part 11 performs a coding and compression of image data (raster scan data) in an image block within the CRT screen and performs a decoding and decompression of the compressed image data. A magnetic disk unit 12 is a disk storage unit in which some control programs to be performed by the CPU 1, transmitting message data and reception message data are stored. A communication control part 13 serves to connect the mixed-mode transmission control apparatus to an integrated-services digital network (ISDN). This communication control part 13 performs a given call setup control procedure between the mixed-mode transmission control terminal and the ISDN and performs a given data transmission procedure between telematics service terminals including mixed-mode transmission control apparatus.

The CPU 1, the ROM 2, the RAM 3, the VRAM 4, the display control part 6, the scanner 7, the printer 8, the keyboard 9, the screen designation unit 10, the coding/decoding part 11, the magnetic disk unit 12, and the communication control part 13 are interconnected by an internal bus 14, and data is exchanged between the above mentioned components primarily via this internal bus 14.

In the magnetic disk unit 12, there is stored a transmitting terminal identifying data which includes a character string data TTIe describing an English-language character string for identifying the transmitting terminal (which is in this case the mixed-mode terminal apparatus as shown in FIG. 1) and a character string data TTIj describing a Japanese-language character string for identifying the transmitting terminal. These character string data TTIe and TTIj for identification of the transmitting terminal, which are shown in FIG. 2, are inputted from the keyboard 9 by an operator and the contents of these character string data are determined arbitrarily by the operator. The character string data TTIe and TTIj are stored and registered in the magnetic disk unit 12.

When a mixed-mode document is prepared at the mixed-mode terminal apparatus for transmitting the document to a reception terminal via the network, a document edit procedure program is started owing to a start command inputted by an operator for the purpose of editing the mixed-mode document before the transmission. In the document edit procedure, for example, document data including only character strings which is already prepared and stored is called out and outputted to the display screen of the CRT display unit 5, and the operator designates the position and size of an image block in which image data should be arranged within the CRT display screen. After the position and size of the image block is designated, the character strings of the document data are reconstructed in the screen in such a way that they appear only in text blocks within the CRT display screen other than the designated position of the image block designated by the operator.

An image whose output data is to be displayed within the image block is scanned by the scanner 7 and the image data is read out from the scanned image, so that the image data is displayed and inserted into the image block in the CRT display screen. FIG. 3A shows an example of the mixed-mode document which is thus prepared. The mixed-mode document shown in FIG. 3A includes a single page, and is formed suitably into three blocks which are a first block BL1, a second block BL2 and a third block BL3. In each of the blocks BL1, BL2 and BL3 in the document, character strings or image data as requested or designated by an operator are arranged.

Figure 3A:
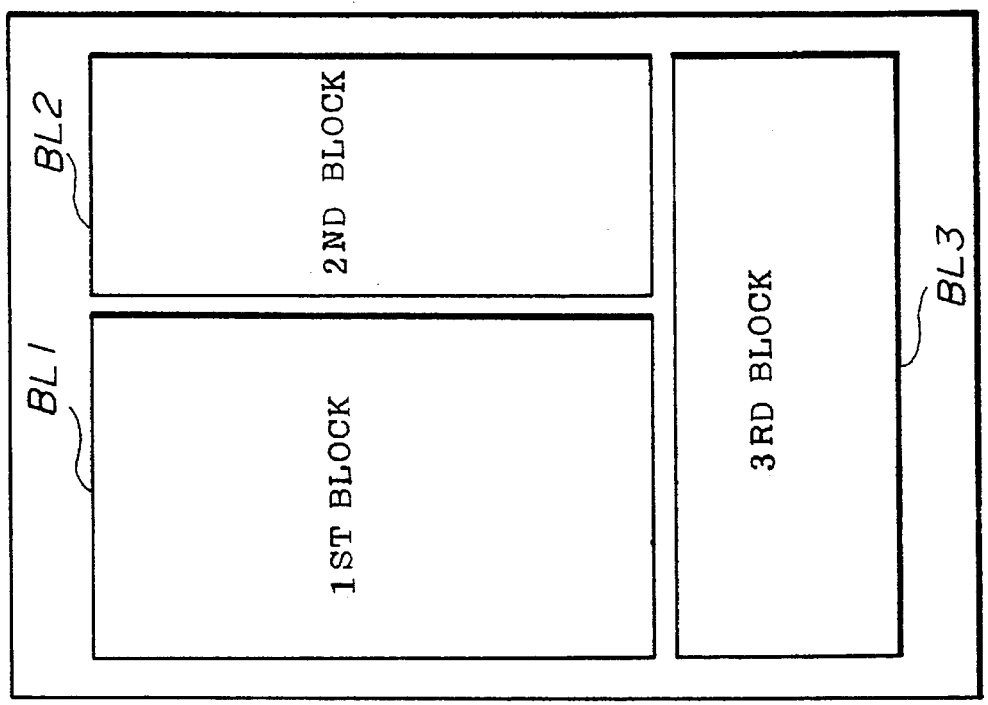

According to the mixed-mode terminal apparatus of the present invention, when the mixed-mode document data is transmitted to a reception terminal, an identification block BTTI for indicating a transmitting terminal identification data is automatically added to the top portion of the mixed-mode document data as a specific block, as shown in FIG. 3B, and the mixed-mode document data with the identification block BTTI is then transmitted from the transmitting terminal to the reception terminal.

This identification block BTTI includes, for example, a date/time data TIM denoting the date and time when the mixed-mode document data is transmitted, a transmitting terminal name data NAM to which one of the two transmitting terminal identifying character string data TTIe and TTIj, stored in the magnetic disk unit 12, is transferred from the magnetic disk unit 12, and a page data PAG denoting the page of the document data being transmitted, as shown in FIG. 4A. The date/time data TIM is generated by using a timer function (not shown) in the mixed-mode transmission control apparatus, and the date/time data TIM is temporarily stored in the magnetic disk unit 12. Thus, it is possible for a reception terminal to receive the mixed-mode document data from the transmitting terminal, the received document data including the date/time data TIM, the transmitting terminal name data NAM and the page data PAG, thus allowing an assorting work of received documents to be easily and safely performed. Also, the identification block BTTI is transmitted as one of specific data in addition to the mixed-mode document data, and therefore an operator at the reception terminal can edit the received document data by deleting the identification block BTTI from the same so as to obtain the original document data. This deleting capability is helpful when the identification block BTTI is displayed such that it is overlapped on a significant data in the sending document data. Thus, the reception terminal can safely receive the original document data created by an operator at the transmitting terminal.

Figure 5:
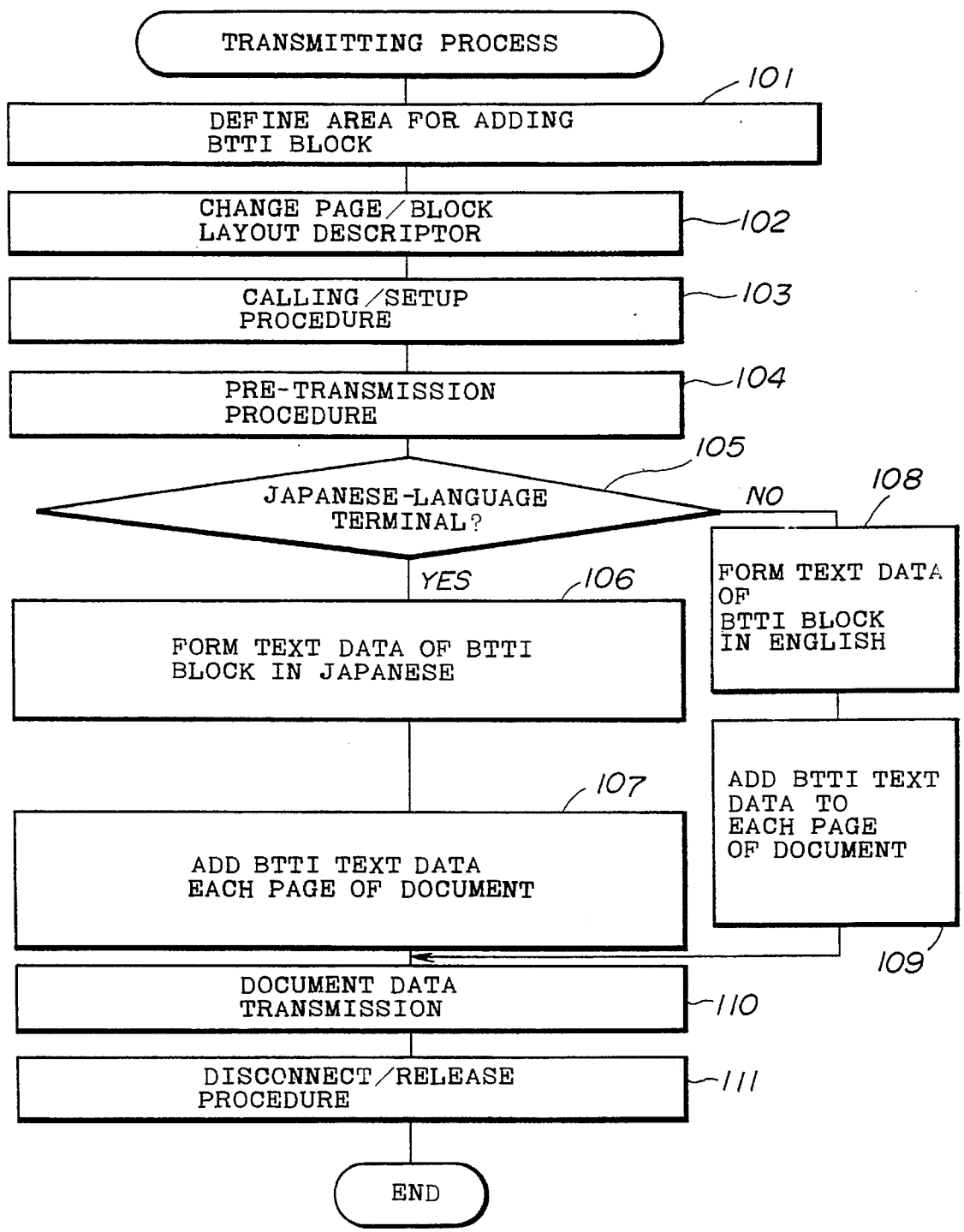
FIG. 5 is a flow chart for explaining a transmitting process for transmitting a mixed-mode document data to a reception terminal.

After the above mentioned editing of the mixed-mode document data is completed, the operator at the transmitting terminal gives a command for calling the reception terminal, to the ISDN by designating a destination code identifying the reception terminal. When such a command is entered by the operator, a transmitting process for sending the mixed-mode document data from the transmitting terminal to the reception terminal is performed. FIG. 5 shows the transmitting process which is performed by the mixed-mode terminal apparatus.

In the flow chart shown in FIG. 5, steps 101 and 102 are performed before a calling of the reception terminal is performed. The step 101 defines an area for adding the identification block BTTI, and the step 102 changes a page/block layout data in the document data to be transmitted, so as to include a layout data describing the identification block BTTI in the page/block layout data of the document data. Then, a step 103 performs a calling of the reception terminal by the designated destination code of the reception terminal and performs a given setup procedure so that a transmission path between the transmitting and reception terminals is established in the network. A step 104 performs a given pre-transmission procedure with the reception terminal by using the transmission path, so that the function to transmit the document data from the transmitting terminal to the reception terminal is confirmed and a negotiation with the reception terminal is performed.

After a given pre-transmission procedure is performed in the step 104, a step 105 judges whether or not the reception terminal is a Japanese-language terminal capable of processing Japanese language data. If the answer in the step 105 is affirmative, a step 106 generates a transmission date/time data TIM, a transmitting terminal name data NAM and a page data PAG which are Japanese-language text data included in the identification block BTTI, as shown in FIG. 4A. A Japanese-language transmitting terminal identifying character string data TTIj and a transmission date/time data are extracted from the magnetic disk unit 12 of the transmitting terminal, and a page data denoting a page number of each page of the sending document data is extracted from the page/block layout data in the sending document data. These text data thus extracted and transferred to each of the text data included in the identification block BTTI. A step 107 adds the formed Japanese-language text unit of the BTTI block to the respective page of the sending document data.

If the transmitting terminal is not a Japanese-language terminal, a step 108 generates a transmission date/time data TIM, a transmitting terminal name data NAM and a page data PAG which are English-language text data included in the identification block BTTI, as shown in FIG. 4A. An English-language transmitting terminal identifying character string data TTIe and a transmission date/time data are extracted from the magnetic disk unit 12 of the transmitting terminal, and a page data denoting each of the pages of the sending document data is extracted from the page/block layout data in the sending document data. These text data are extracted and transferred to each of the text data included in the identification block BTTI. A step 107 adds the formed English-language text unit of the BTTI block to the respective page of the sending document data.

A step 110 performs a given document data transmission procedure for transmitting the mixed-mode document data from the transmitting terminal to the reception terminal, the mixed-mode document data thus transmitted including the text data of the identification block BTTI being added to each page of the document data transmitted. After the transmission of the mixed-mode document data is completed, a step 111 performs a given disconnect/release procedure so that the transmission path is terminated and a channel for the document data transmission is released from the network.

As described above, in a case in which the reception terminal is a Japanese language terminal, the mixed-mode document data before transmission is converted in such a way that the transmitting terminal identifying data in Japanese may be displayed within the identification block BTTI. Also, in a case in which the reception terminal is any other terminal than the Japanese-language terminal, the mixed-mode document data before transmission is converted in such a way that a standard transmitting terminal identifying data, expressed in English, may be displayed in the identification block BTTI. The mixed-mode document data after such conversion has been made is transmitted to the reception terminal. Accordingly, when the reception terminal is a Japanese-language terminal, the reception terminal can receive the mixed-mode document data with the Japanese-language identifying data being added to the top portion of each page of the document data. When the reception terminal is a terminal other than the Japanese-language terminal, it can receive the mixed-mode document data with the standard English-language identifying data being added to the top portion of each page of the mixed-mode document data. Therefore, the reception terminal can clearly discriminate the transmitting terminal, and a page assortment work for the received document data can be easily performed.

Figure 6:
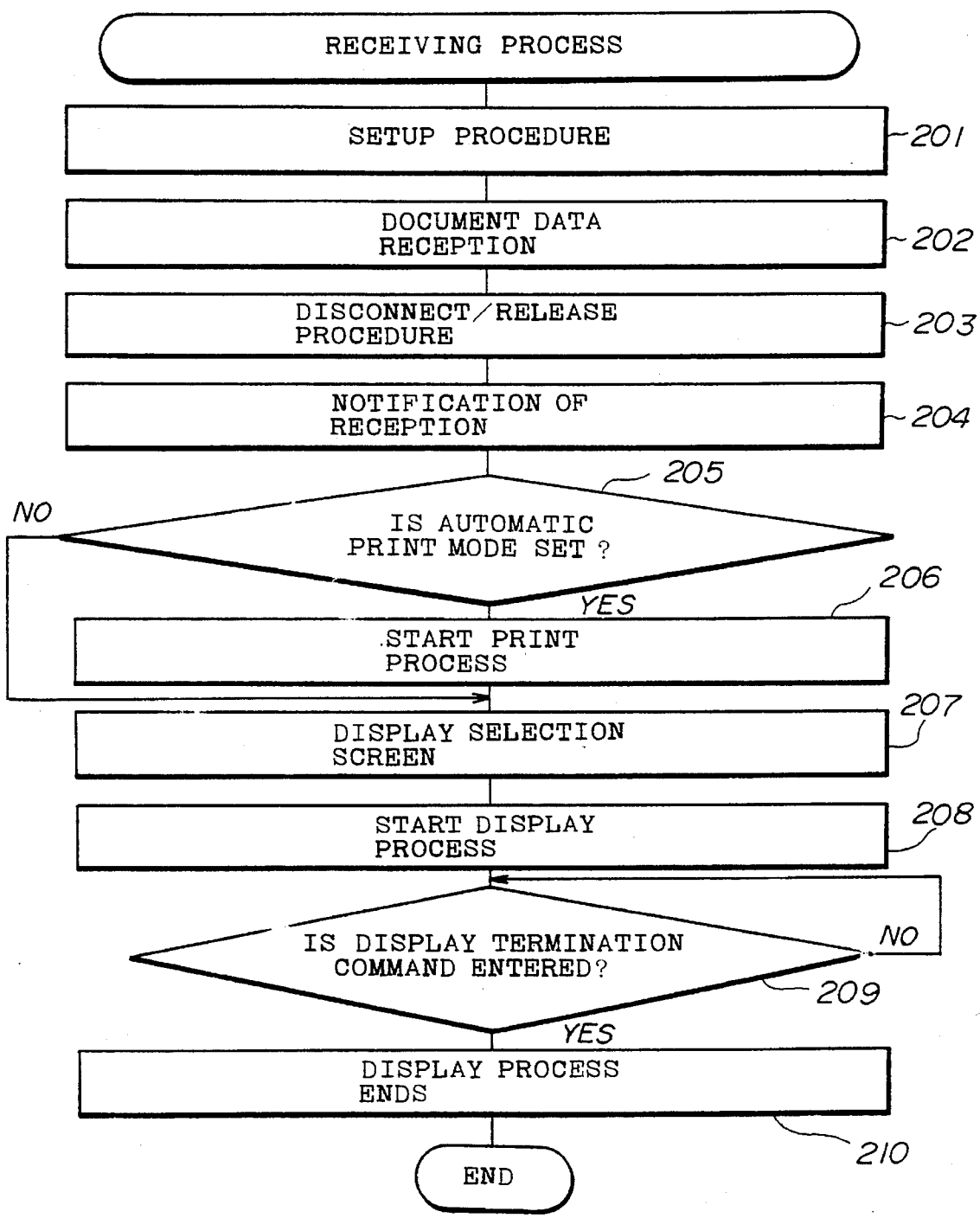
FIG. 6 is a flow chart for explaining a receiving process for receiving the mixed-mode document data from the transmitting terminal.

FIG. 6 shows a receiving process for receiving the mixed-mode document data from the transmitting terminal. This receiving process is carried out by the reception terminal which has the same construction as shown in FIG. 1.

A step 201 performs a setup procedure so that a transmission path is established between the transmitting and reception terminals. A step 202 performs a given document data reception procedure to receive the mixed-mode document data from the transmitting terminal, and the received document data is stored in the magnetic disk unit 12 of the reception terminal. A step 203 performs a given disconnect/release procedure so that the transmission path is terminated and the call release is performed. In this manner, when the mixed-mode document data is received, a step 204 displays a notification of the reception of the document data at a prescribed area of a screen of the CRT display unit 5 of the reception terminal. By this notification, an operator at the reception terminal is notified of the reception of the document data from the transmitting terminal.

A step 205 determines whether or not an automatic print mode in which the received document data is automatically printed out is set. If the answer in the step 205 is affirmative, a step 206 starts a print process for printing the received document data by the printer 8. On the other hand, if the answer in the step 205 is negative, a step 207 is next performed without performing the step 206.

In the step 207, a selection screen is displayed on the CRT display unit 5 so that an operator can enter, from the selection screen, a document file choice to designate a file of the document data to be displayed on the CRT display unit 5 and a display command for requesting that the document data is output to the CRT display unit 5. When the operator enters a document file choice and a display command from the selection screen, a step 208 starts a display process for displaying the designated file of the document data on the CRT display unit 5. A step 209 checks whether or not a display termination command is entered by the operator. The reception terminal is in a waiting condition until the display termination command is given. If such a command is entered, a step 210 terminates the display process, then the receiving process by the reception terminal ends.

AS described above, when the mixed-mode document data is received from the transmitting terminal, an operator at the reception terminal is notified of the reception by a notification thereof being displayed on the CRT display unit. A selection screen is then displayed on the CRT display so that the operator can designate a file of the document data from the selection screen and enter a display command. If the display command is entered by the operator, the document data of the designated file is displayed on the CRT display unit. If a display termination command is entered, the display of the document data on the CRT display unit is completed and the entire process from the document data reception and the document data display on the CRT display unit ends. Also, if an automatic print mode is set, the image of the received document data is output to the printer 8 for printing out the image.

Figure 7:
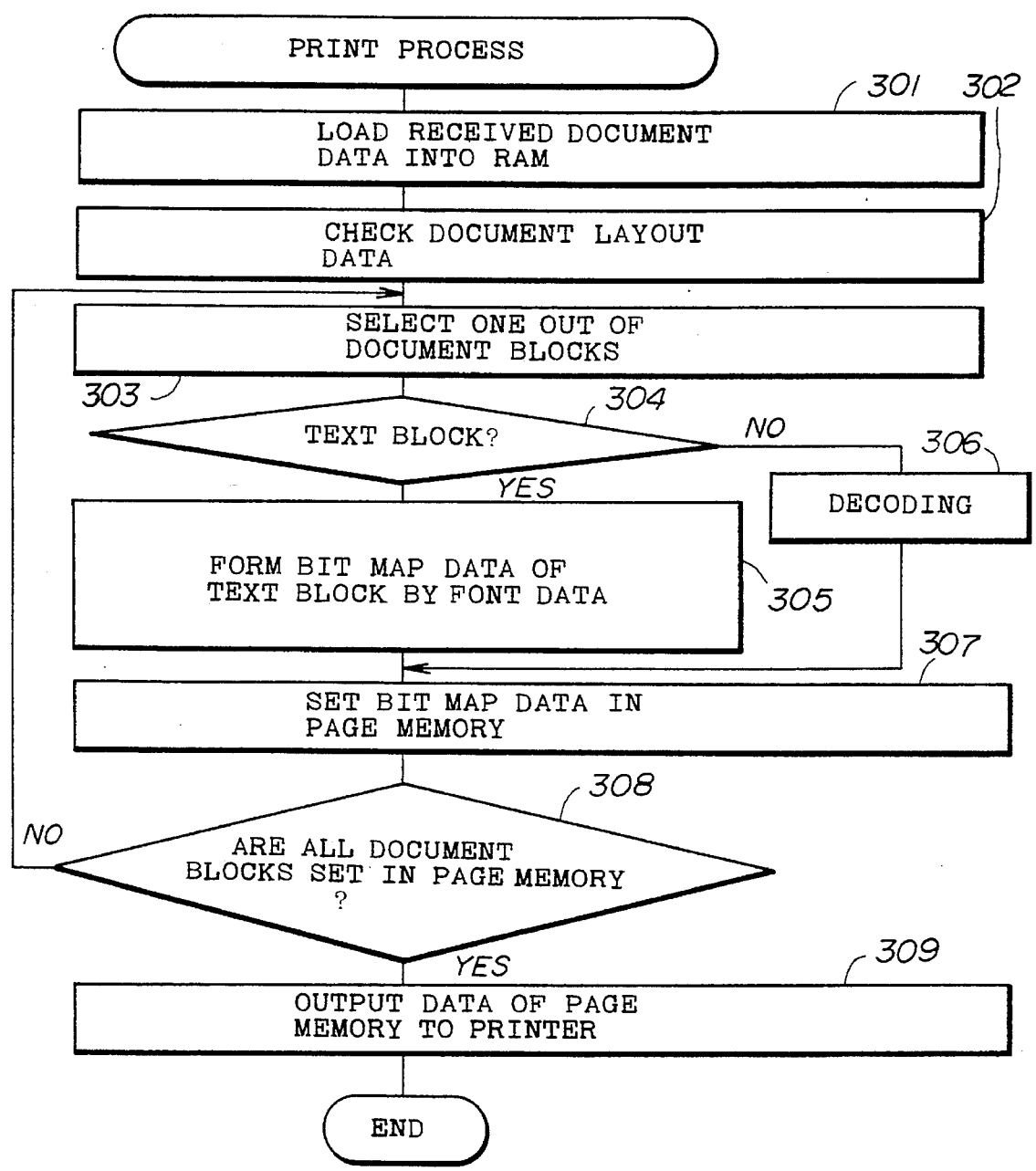
FIG. 7 is a flow chart for explaining a print process for printing the mixed-mode document data received by the reception terminal.

FIG. 7 shows the print process which is performed in the above step 206 in the flow chart shown in FIG. 6. Shown is a case in which the received document data includes only one page. A step 301 loads a file of the received document data, stored in the magnetic disk unit 12, into the RAM 3 of the reception terminal. A step 302 checks a layout data included in the document data in the RAM 3. This layout data is a file management data describing a structure of the document data and an arrangement of document blocks included in the document data. A step 303 selects out one of the document blocks in the received document data, and a step 304 determines whether or not the selected document block is a text block. If the answer in the step 304 is affirmative, a step 305 forms a bit map data corresponding to the record data of the text block on the basis of character font data stored in the ROM 2. If the answer in the step 304 is negative, the selected document block is an image block (raster block) in which image data is included. A step 306 performs decoding of image data of the image block so that the image data is converted into the original record data.

After the bit map data corresponding to the record data of one block is formed in this manner, a step 307 sets output data of one block with respect to the bit map data formed in a page memory within the RAM 3 at an area of the page memory corresponding to a position of the record data of the block in relation to the received document data. Each time the output data of one block is set in the page memory in the RAM 3, a step 308 determines whether or not the setting of the output data in the page memory for all the document blocks included in the document data is completed. If the answer in the step 308 is negative, the steps 303 to 308 are repeated for the following document blocks. If the answer in the step 308 is affirmative, that is, the setting of the output data in the page memory for all the document blocks is completed, a step 309 prints out the output data in the page memory by the printer 8 by transferring the output data from the page memory in the RAM 3 to the printer 8. In this manner, the output data for all the document blocks in the received document data is set in the page memory with respect to one page thereof, and the printer 8 prints out the output data in the page memory as the record image of the received document data.

Figure 8:
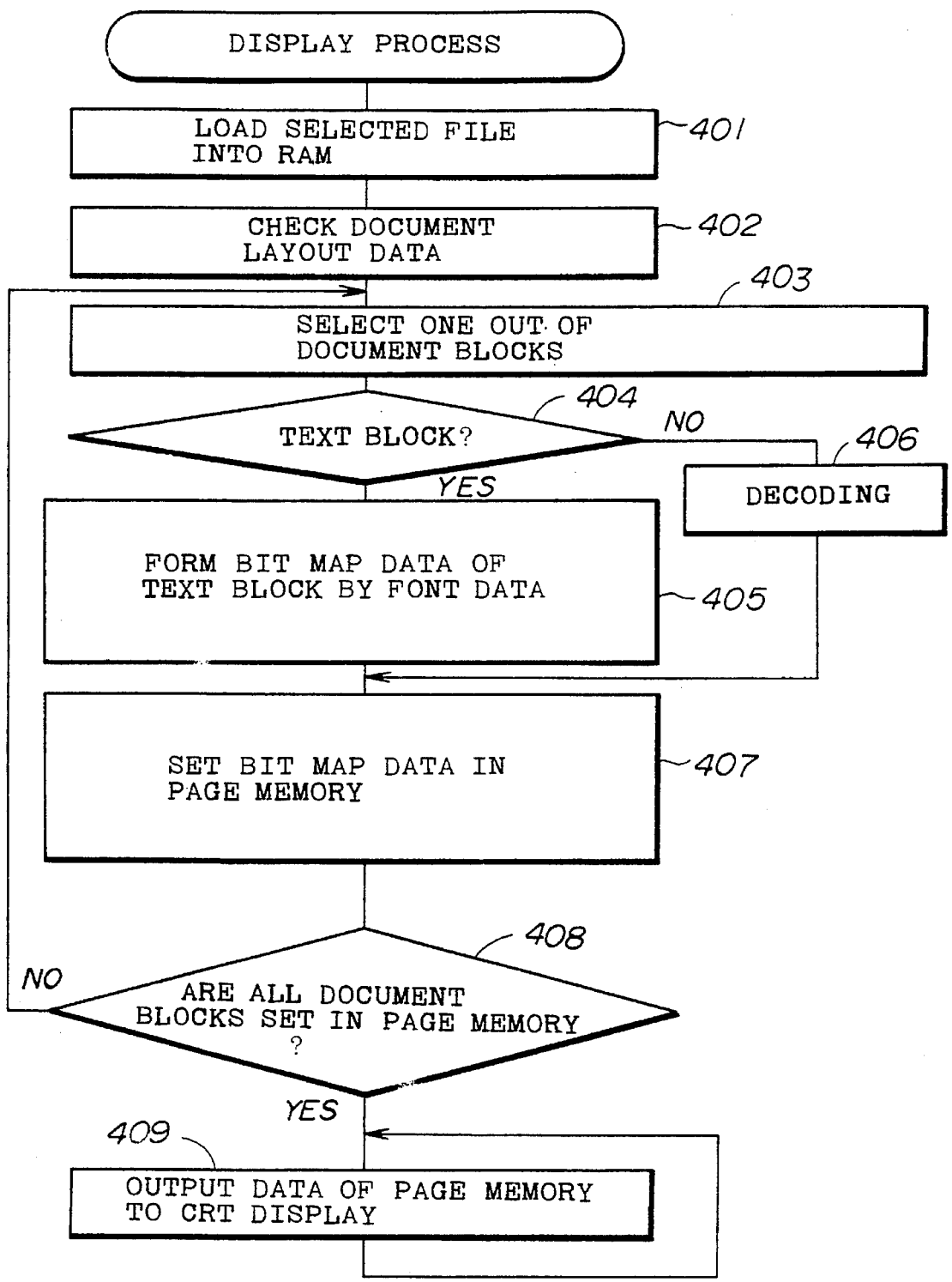
FIG. 8 is a flow chart for explaining a display process for displaying the received document data on a CRT display unit.

FIG. 8 shows the display process for displaying the received document data on the CRT display unit 5, which display process is performed in the above step 208 in the flow chart shown in FIG. 6. Shown is a case in which the received document data includes only one page. A step 401 loads a selected file of received document data, stored in the magnetic disk unit 12, into the RAM 3 of the reception terminal. A step 402 checks a layout data included in the document data in the RAM 3, the layout data being a file management data describing a structure of the document data and an arrangement of blocks included in the document data. A step 403 selects out one of the blocks in the document data, and a step 404 determines whether or not the selected document block is a text block. If the answer in the step 404 is affirmative, a step 405 forms a bit map data corresponding to the record data of the text block on the basis of character font data stored in the ROM 2. If the answer in the step 404 is negative, the selected document block is an image block. A step 406 performs decoding of image data of the image block so that the image data is converted into the original record data.

After the bit map data corresponding to the record data of one block is formed in this manner, a step 407 sets output data of one block, with respect to the bit map data formed in the page memory (within the RAM 3), at an area of the page memory corresponding to a position of the record data of the block in relation to the received document data. Each time the output data of one block is set in the page memory in the RAM 3, a step 408 determines whether or not the setting of the output data in the page memory for all the document blocks included in the document data is completed. If the answer in the step 408 is negative, the steps 403 to 408 are repeated for the following document blocks. If the answer in the step 408 is affirmative, that is, the setting of the output data in the page memory for all the document blocks is completed, a step 409 displays the output data in the page memory on the CRT display unit 5 by transferring the output data from the page memory in the RAM 3 to the VRAM 4. In this manner, the output data for all the document blocks in the document data of the designated file is set in the page memory with respect to one page thereof, and the output data in the page memory is displayed on the CRT display unit 5.

When a resolution of output data displayed on the CRT display unit 5 differs from a resolution of output data recorded by the printer 8, bit map data in conformity with each of different resolutions of the CRT display unit 5 and the printer 8 is formed, and the bit map data is set in the page memory according to the present invention.

Also, according to the present invention, when a print command is entered by an operator while an arbitrary screen is displayed on the CRT display unit 5, the data of the page memory corresponding to the data of the VRAM 4 in that time is converted into record data, and the record data is transferred to the printer 8 so that the image of the screen displayed on the CRT display unit 5 is printed out. Therefore, it is possible for an operator to obtain a hard copy of the screen displayed on the CRT display unit 5 at an arbitrary time.

Figure 9:
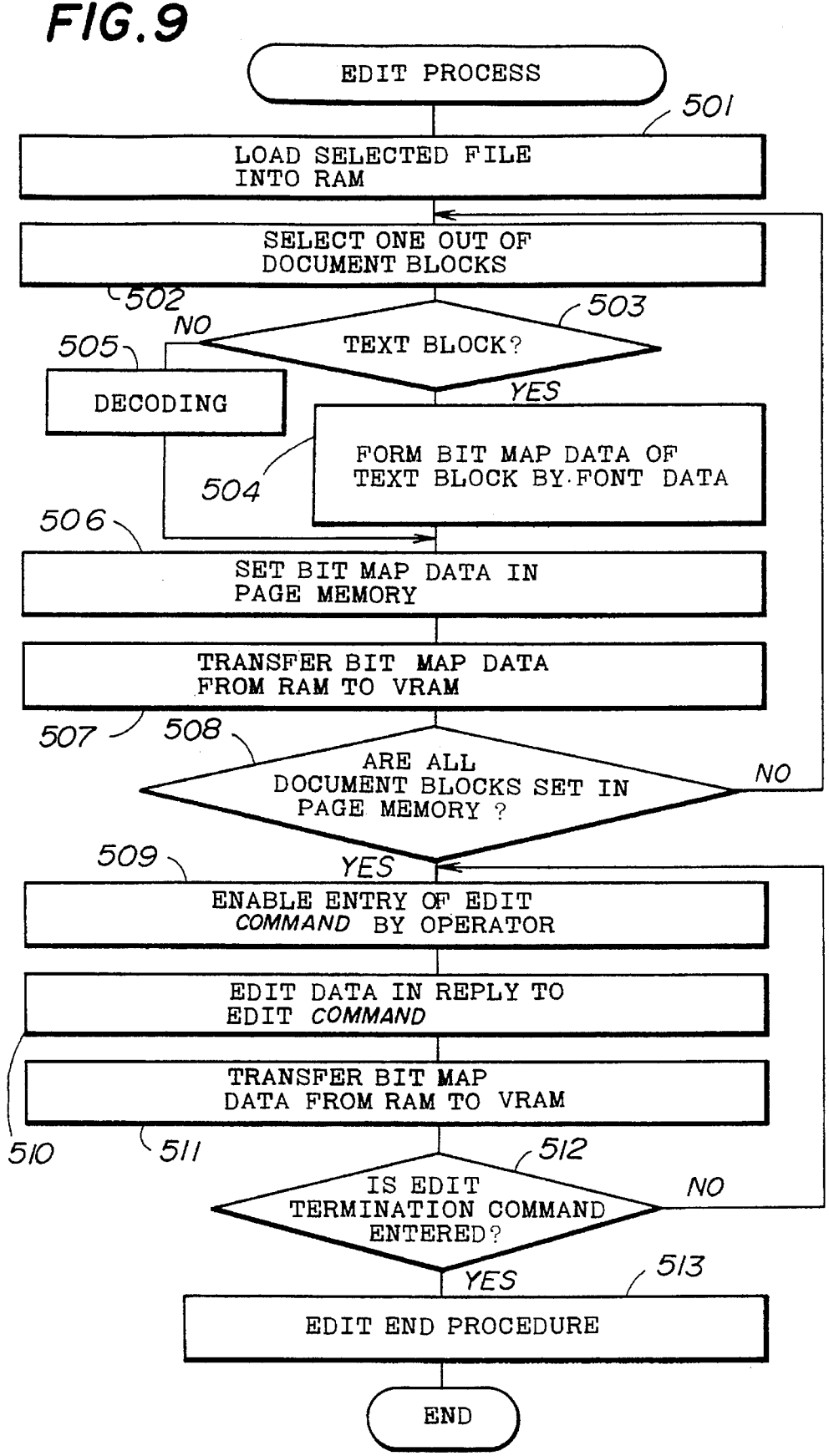
FIG. 9 is a flow chart for explaining an edit process for editing the document data before the transmission.

FIG. 9 shows an edit process for editing a different mixed-mode document data, which process is performed by making reference to a file of the received document data stored in the magnetic disk unit 12. A step 501 in the flow chart shown in FIG. 9 loads a selected file of received document data, stored in the magnetic disk unit 12, into the RAM 3 of the reception terminal. A step 502 selects out one of the blocks in the document data, and a step 503 determines whether or not the selected document block is a text block. If the answer in the step 503 is affirmative, a step 504 forms a bit map data corresponding to the record data of the text block on the basis of character font data stored in the ROM 2. If the answer in the step 503 is negative, the selected document block is an image block, and a step 505 performs decoding of image data of the image block so that the image data is converted into the original record data.

After the bit map data corresponding to the record data of one block is formed in this manner, a step 506 sets output data of one block with respect to the bit map data in the page memory (within the RAM 3) at an area of the page memory corresponding to a position of the record data of the block in relation to the received document data. A step 507 transfers the output data of one block from the page memory to the VRAM 4 so that the content of output data on the CRT display unit 5 is renewed. Each time the output data of one block is set in the page memory in the RAM 3, a step 508 determines whether or not the setting of the output data in the page memory for all the document blocks included in the document data is completed. If the answer in the step 508 is negative, the steps 502 to 507 are repeated for the following document blocks. If the answer in the step 508 is affirmative, that is, the setting of the output data in the page memory for all the document blocks is completed, a step 509 enables an edit command for editing data in the page memory to be entered by the operator on the screen of the CRT display unit 5. A step 510 performs editing of the output data in the page memory in response to the edit command entered by the operator on the CRT display unit 5. And, a step 511 transfers the output data as a result of the edit operation from the page memory to the VRAM 4 so that the content of display data output to the CRT display unit 5 is renewed.

Each time one edit operation for editing the output data is completed, a step 512 determines whether or not an edit termination command is entered by the operator. If the answer in the step 512 is negative, the steps 509 to 511 are repeated for the following edit operations entered by the operator. If the answer in the step 512 is affirmative, a step 513 performs a given edit end procedure, and the edit process shown in FIG. 9 ends. During the edit process described above, it is possible to select an arbitrary block in the document data for which an edit operation is conducted by the operator. Therefore, according to the present invention, it is possible that the identification block BTTI which has been added to the mixed-mode document data at the transmitting terminal be deleted from the received document data at the reception terminal. An operator at the reception terminal can freely modify the original document data prepared by an operator at the transmitting terminal. Also, it is a matter of course that an operator at the reception terminal can edit or modify a different document data, loaded into the page memory in the RAM 3, by making use of part of data included in blocks of the received document data.

Figure 10:
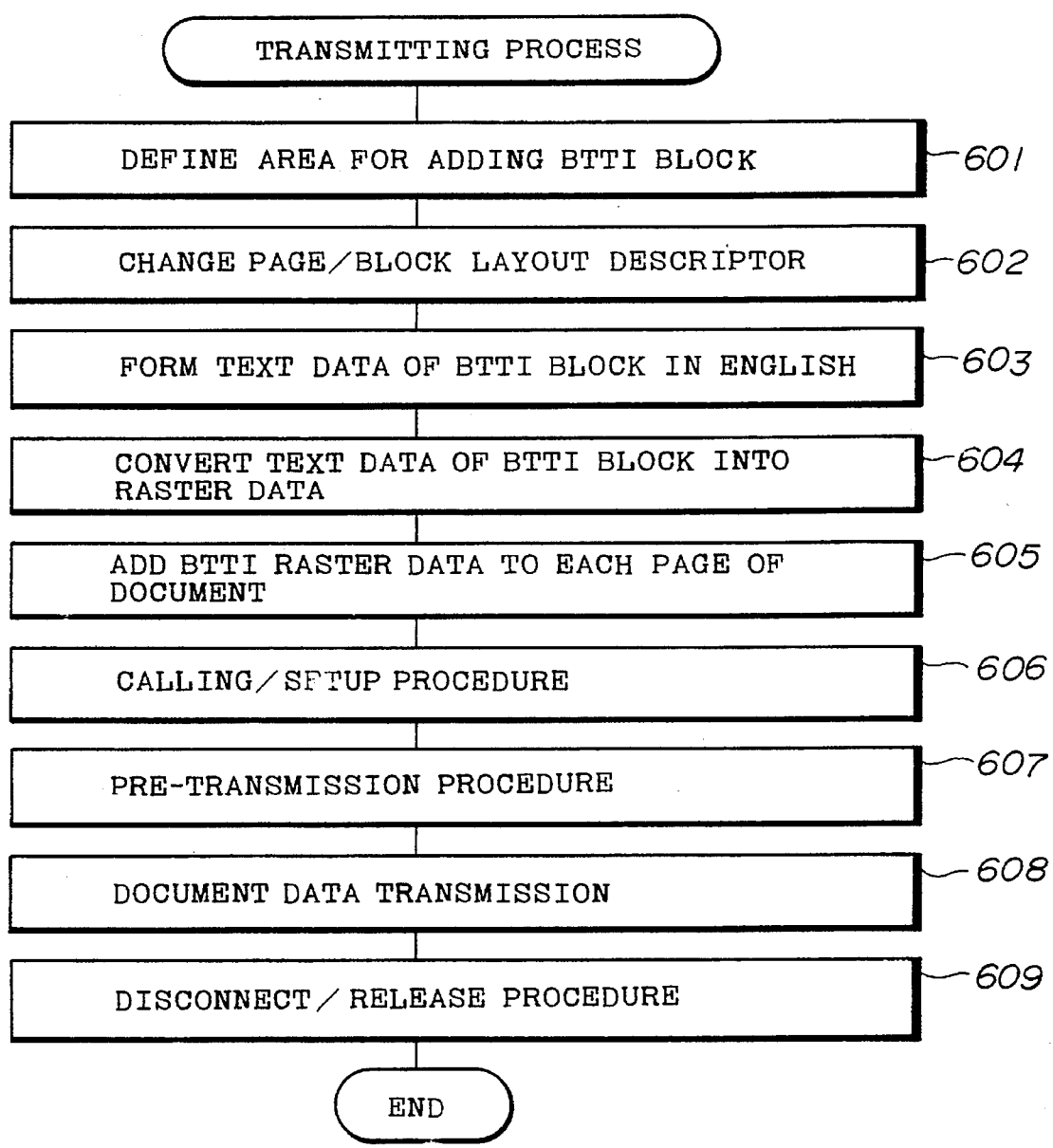
FIG. 10 is a flow chart for explaining a modified transmitting process for transmitting a mixed-mode document data with a raster-data identification block from the transmitting terminal to the reception terminal.

In the above described embodiment, text data is used in the text unit of the identification block BTTI. However, according to the present invention, it is possible to set arbitrary raster data in the unit of the identification block BTTI. FIG. 10 shows a transmitting process in such a case which is performed by the mixed-mode terminal apparatus for transmitting a mixed-mode document data with the identification block BTTI. As in the above described embodiment, after the preparation and editing of a mixed-mode document data is completed and a command for calling a reception terminal is given to the ISDN by designating a destination code identifying the reception terminal, the transmitting process for sending the mixed-mode document data from the transmitting terminal to the reception terminal via the ISDN is started.

In the flow chart shown in FIG. 10, before a calling of the reception terminal is performed, a step 601 defines an area for adding the identification block BTTI and a step 602 changes a page/block layout data of the mixed-mode document data to be transmitted so as to include a layout data concerning the newly added identification data BTTI in the page/block layout data of the document data.

A step 603 generates a transmission date/time data TIM, a transmitting terminal name data NAM and a page data PAG which are English-language text data included in the identification block BTTI, as shown in FIG. 4A. An English-language transmitting terminal identifying character string data TTIe and a transmission date/time data are extracted from the magnetic disk unit 12 of the transmitting terminal, and a page data denoting each of the pages of the sending document data is extracted from the page/block layout data in the sending document data. These text data are transferred to the text data included in the identification block BTTI. A step 604 converts the character data of the identification block BTTI into raster data denoting the contents of the identification block BTTI. A step 605 adds the converted unit of the raster data to the respective page of the sending document data.

Next, a step 606 performs a calling of the reception terminal designating a destination code of the reception terminal and performs a given setup procedure so that a transmission path is established between the transmitting and reception terminals. A step 607 performs a given pre-transmission procedure between the transmitting terminal and the reception terminal by using the transmission path, so that the function to transmit the document data from the transmitting terminal to the reception terminal is confirmed and a negotiation with the reception terminal is performed. A step 608 performs a given document data transmission procedure so that the mixed-mode document data with the identification block BTTI from the transmitting terminal to the reception terminal, the mixed-mode document data including the raster data of the identification block BTTI being added to each page of the document data. After the transmission of the mixed-mode document data is completed, a step 609 performs a given disconnect/release procedure so that the transmission path is terminated and a channel for the document data transmission is released from the network.

In this manner, the raster data in the identification block BTTI is prepared and the raster data therein is added to each page of the sending document data before a calling of the reception terminal is performed, and it is possible to shorten the time required for the document data transmission. Also, in the above described embodiment shown in FIG. 5, a character string data is used as part of the transmitting terminal identifying data in the identification block BTTI. However, according to the modified transmitting process shown in FIG. 10, arbitrary graphic data, which is, for example, a company identifying mark, a hand-written signature, a special mark and so on, can be included in the identification block BTTI.

Also, in the above described embodiment as shown in FIG. 5, it is possible to choose either of the Japanese-language data and the English-language data for identifying the transmitting terminal, depending on whether or not the reception terminal is a Japanese-language terminal. However, the present invention is not limited to this embodiment, and the number of different transmitting terminal identifying data and the selecting method to select one identifying data from among those identifying data may be changed within the scope of the present invention. For example, it is possible to previously record arbitrary data for identifying a transmitting terminal with respect to each of several operators who operate the mixed-mode terminal apparatus. In this case, if an operator enters his identification code before a mixed-mode document data is transmitted, it is possible to set up a transmitting terminal identifying data, which was registered by the operator himself, and such an identifying data is added to the respective page of the sending document data. Also, according to the present invention, it is possible to perform an editing of the transmitting terminal identifying data while a sending mixed-mode document data is edited before transmission.

In addition, in the above described embodiment as shown in FIG. 4A, the identification block as a whole is set as a specific block BTTI added to the sending mixed-mode document data. However, according to the present invention, it is possible to set the date/time data TIM and the transmitting terminal name data NAM as a generic block GTTI and set only the page data PAG denoting the reference number as a specific block STTI, as shown in FIG. 4B. In this case, the quantity of information contained in the specific block STTI is reduced considerably, and this is helpful when the identification block containing raster data is transmitted.

In addition, in the above described embodiment, the identification block is always added to the sending document data. However, according to the present invention, it is possible for a user for individual mixed-mode terminal apparatus to determine whether or not the function of adding the identification block is selected. Also, in the above described embodiment, a case in which a mixed-mode document is sent from a transmitting terminal directly to a reception terminal has been described. However, the concept of the present invention may applied to a relay function of transmitting a mixed-mode document received from a terminal to another terminal. Also, in the above described embodiment, a case in which a sending document data includes only one page has been described. However, the present invention may be applied in a similar manner to a case in which a sending document data includes plural pages.

Further, the present invention is not limited to the above described embodiment, and variations and modifications may be made without departing from the scope of the present invention.

What is claimed is:

1. An apparatus for processing mixed-mode document data in which encoded character text data and raster image data coexist and for transmitting the mixed-mode document data in a plurality of mixed-mode format blocks from a transmitting terminal to a reception terminal via a network, said apparatus comprising:

storage means for storing at least one of terminal identifying data identifying the transmitting terminal, date/time data denoting a date and time of transmission, and page number data denoting each page of the mixed-mode document data;

generating means for generating an identification block in a mixed mode format, said identification block including at least one of the terminal identifying data, the date/time data and the page number data stored in said storage means;

editing means for editing the mixed-mode document data so that the identification block generated by said generating means is added to said plurality of mixed-mode format blocks of the mixed-mode document data before the transmission; and control means for transmitting the mixed-mode document data in said plurality of mixed-mode format blocks including said identification block added by said editing means to the reception terminal by performing a predetermined data transmission procedure.

2. The apparatus as claimed in claim 1, wherein said storage means contains the terminal identifying data which includes a character data only, and said generating means generates the identification block in which only said character data is included.

3. The apparatus as claimed in claim 1, further comprising decoding means for converting said terminal identifying data, said date/time data and said page number data, which are stored in said storage means, into raster data, thereby said generating means generating the identification block in which only said raster data is included.

4. The apparatus as claimed in claim 1, wherein said storage means contains at least Japanese-language character string data describing said terminal identifying data and said date/time data and English-language character string data describing said terminal identifying data and said date/time data.

5. The apparatus as claimed in claim 4, further comprising judgment means for judging if the reception terminal is a Japanese-language terminal, said generating means generating said identification block into which at least said Japanese-language character string data contained in said storage means is transferred if the reception terminal is judged as being a Japanese-language terminal, and said generating means generating said identification block into which at least said English-language character string data contained in said storage means is transferred if the reception terminal is judged as not being a Japanese-language terminal.

6. The apparatus as claimed in claim 1, further comprising:

a first memory in which a set of character font data is stored;

second storage means in which a mixed-mode document data received from the transmitting terminal is stored, said mixed-mode document data including at least one block;

a second memory into which one block of said mixed-mode document data stored in said second storage means is transferred;

checking means for determining if said one block of the mixed-mode document data in said second memory is a text block;

bit map generating means for generating a bit map data from said one document block in said second memory, on the basis of said character font data stored in said first memory, when said one document block is a text block; and a third memory into which said bit map data generated in said second memory is transferred by said bit map generating means.

7. The apparatus as claimed in claim 6, further comprising decoding means for converting said one block of the mixed-mode document data into raster data if said one document data is not a text data, said raster data being transferred into said third memory by said decoding means.

8. The apparatus as claimed in claim 7, further comprising display means for outputting said bit map data in said third memory after all the blocks of the mixed-mode document data are set in said third memory so that the received mixed-mode document data is displayed on the display means.

9. The apparatus as claimed in claim 7, further comprising input means from which a command is inputted by an operator, said bit map generating means performing an edit operation for reconstructing the bit map data in said second memory in response to said command inputted by the operator.

10. The apparatus as claimed in claim 1, wherein the generating means generates an identification block specific to each respective page of the mixed-mode document data by transferring the terminal identifying data, the date/time data, and each page number data, stored in the storage means, into the identification block.

11. The apparatus as claimed in claim 1, wherein the apparatus is a group-4, class-3 facsimile apparatus.

12. A group-4 facsimile apparatus for processing mixed-mode document data in which encoded character text data and raster image data coexist and for transmitting the mixed-mode document data in a plurality of mixed-mode blocks from a transmitting terminal to a reception terminal via a network, comprising:

storage means for storing each of terminal identifying data identifying the transmitting terminal, date/time data denoting a date and time of transmission, and page number data denoting each page of the mixed-mode document data;

generating means for generating an identification block in a mixed-mode format, the identification block including at least one of the terminal identifying data, the date/time data and the page number data stored in the storage means;

editing means for editing the mixed-mode document data so that the identification block generated by said generating means is added to said plurality of mixed-mode format blocks of the mixed-mode document data before transmission of the mixed-mode document data; and control means for transmitting the mixed-mode document data in said plurality of mixed-mode format blocks including the identification block added by said editing means to the reception terminal by performing a predetermined data transmission procedure.

13. The apparatus as claimed in claim 12, wherein the apparatus is further a class-3 facsimile apparatus.

* * * * *